US006941513B2

(12) United States Patent
Meystel et al.

(10) Patent No.: US 6,941,513 B2
(45) Date of Patent: Sep. 6, 2005

(54) SYSTEM AND METHOD FOR TEXT STRUCTURING AND TEXT GENERATION

(75) Inventors: Alexander M. Meystel, Bala Cynwyd, PA (US); Marina M. Meystel, Bala Cynwyd, PA (US); Michael A. Meystel, Spring City, PA (US)

(73) Assignee: Cognisphere, Inc., West Chester, PA (US)

( * ) Notice: Subject to any disclaimer, the term of this patent is extended or adjusted under 35 U.S.C. 154(b) by 650 days.

(21) Appl. No.: 09/839,226

(22) Filed: Apr. 20, 2001

(65) Prior Publication Data

US 2001/0056445 A1 Dec. 27, 2001

Related U.S. Application Data

(60) Provisional application No. 60/211,600, filed on Jun. 15, 2000.

(51) Int. Cl.[7] .............................................. G06F 17/00
(52) U.S. Cl. ...................................... 715/530; 715/531
(58) Field of Search ................................ 715/531, 530, 715/538; 704/4, 9

(56) References Cited

U.S. PATENT DOCUMENTS

| 4,417,322 A | 11/1983 | Berry et al. |
| 4,456,973 A | 6/1984 | Carlgren et al. |
| 4,495,566 A | 1/1985 | Dickinson et al. |
| 4,553,860 A | 11/1985 | Imaizumi et al. |
| 4,580,218 A | 4/1986 | Raye |
| 4,712,174 A | 12/1987 | Minkler, II |
| 4,750,122 A | 6/1988 | Kaji et al. |
| 4,771,401 A | 9/1988 | Kaufman et al. |
| 4,773,009 A | 9/1988 | Kucera et al. |
| 4,773,039 A | 9/1988 | Zamora |
| RE32,773 E | 10/1988 | Goldwasser et al. |
| 4,813,010 A | 3/1989 | Okamoto et al. |

(Continued)

Primary Examiner—Sanjiv Shah
Assistant Examiner—Laurie Anne Ries
(74) Attorney, Agent, or Firm—Dann Dorfman Herrell and Skillman, PC

(57) ABSTRACT

The present invention provides a computer-implemented system and method of text processing. The system and method include analyzing selected text units of a digitally coded parsed text file to determine text entities, determine the interconnections between the text entities, test the validity of the text entities, and determine a quantitative measure of the significance of each text entity. A multigranular relational text structure is constructed which incorporates the text entities. Output text is generated from the relational text structure using entity grouping rules. The text file is parsed using a system of natural dividers. The text units are selected from the parsed text file using windowing and scanning. The output text generated conforms to user constraints which can include the volume of output text to be generated, keywords to be reflected in the output text, and the level of generalization of the output text.

34 Claims, 10 Drawing Sheets

U.S. PATENT DOCUMENTS

| | | | |
|---|---|---|---|
| 4,864,502 A | 9/1989 | Kucera et al. | |
| 4,964,030 A | 10/1990 | Suzuki et al. | |
| 5,072,385 A | 12/1991 | Rebeillard et al. | |
| 5,077,668 A | 12/1991 | Doi | |
| 5,111,398 A | 5/1992 | Nunberge et al. | |
| 5,119,491 A | 6/1992 | Iwai et al. | |
| 5,146,405 A | 9/1992 | Church | |
| 5,200,893 A * | 4/1993 | Ozawa et al. | 715/531 |
| 5,297,027 A | 3/1994 | Morimoto et al. | |
| 5,331,556 A | 7/1994 | Black, Jr. et al. | |
| 5,384,703 A | 1/1995 | Withgott et al. | |
| 5,491,760 A | 2/1996 | Withgott et al. | |
| 5,551,049 A | 8/1996 | Kaplan et al. | |
| 5,638,543 A | 6/1997 | Pedersen et al. | |
| 5,689,716 A | 11/1997 | Chen | |
| 5,721,938 A | 2/1998 | Stuckey | |
| 5,778,397 A | 7/1998 | Kupiec et al. | |
| 5,794,178 A | 8/1998 | Caid et al. | |
| 5,838,323 A | 11/1998 | Rose et al. | |
| 5,867,164 A | 2/1999 | Bornstein et al. | |
| 5,892,842 A | 4/1999 | Bloomberg | |
| 5,918,240 A * | 6/1999 | Kupiec et al. | 715/531 |
| 5,920,870 A | 7/1999 | Briscoe et al. | |
| 5,924,108 A | 7/1999 | Fein et al. | |
| 5,958,006 A | 9/1999 | Eggleston et al. | |
| 5,963,969 A | 10/1999 | Tidwell | |
| 5,978,820 A * | 11/1999 | Mase et al. | 715/531 |
| 5,991,713 A * | 11/1999 | Unger et al. | 704/9 |
| 6,023,670 A | 2/2000 | Martino et al. | |
| 6,108,620 A * | 8/2000 | Richardson et al. | 704/9 |
| 6,167,370 A * | 12/2000 | Tsourikov et al. | 704/9 |
| 6,272,495 B1 * | 8/2001 | Hetherington | 707/101 |
| 6,317,708 B1 * | 11/2001 | Witbrock et al. | 704/9 |
| 6,341,372 B1 * | 1/2002 | Datig | 717/136 |

\* cited by examiner

SYSTEM AND METHOD FOR TEXT STRUCTURING AND TEXT GENERATION

CROSS-REFERENCE TO RELATED APPLICATIONS

This application claims the benefit of U.S. Provisional Patent Application No. 60/211,600, filed Jun. 15, 2000 entitled "Method and Apparatus For Text Structuring and New Text Generation", the contents of which is hereby incorporated by reference in its entirety.

BACKGROUND OF THE INVENTION

The present invention relates to systems and methods for text processing and, in particular, to text structuring and generation of new text having varying degrees of compression.

The desirability of summaries, annotations and abstracts has greatly increased in recent years because of the large quantity of publicly available on-line, machine-readable information. The generation of summary documents serves a valuable function by reducing the time required to review and understand the substance of one or more full-length documents. The generation of document summaries, annotations or abstracts can be performed manually or automatically. Manual summarization relies on an individual summarizing the document, and can be costly, time consuming and inaccurate. Summaries generated automatically, however, can be produced more efficiently, cheaper and with greater accuracy.

Conventional text processing techniques for natural language typically treat text as a sequence of codes. The codes used include alphabetic and numeric character codes, as well as punctuation mark codes and carriage-control codes that indicate carriage operations such as spaces, tabs and carriage returns.

The processing to natural language text is a computationally intensive process. Producing semantically correct summaries and abstracts is difficult using natural language processing when document content is not limited. Two of the most difficult processes in automated text structuring of natural language text (particularly when ambiguity of text is considered) are: 1) automatically explicating from text, all meaningful groups of words, phrases, simple and compound sentences; and 2) automatically encapsulating meaningful groups of words within the boundaries of a generalized notion that is considered a text unit of coarser granularity.

BRIEF SUMMARY OF THE INVENTION

A first embodiment of the present invention provides a method of computer based text processing. The method includes inputting a digitally coded text file, parsing the text file, and selecting text units from the parsed text file. The text file is parsed using a system of natural dividers to recognize text sections, paragraphs, sentences, and words. Selecting text units from the parsed text file is accomplished using windowing and scanning. The text units are then analyzed to determine text entities, determine the interconnections between the text entities, test the validity of the text entities, and determine a quantitative measure of the significance of each text entity. The text entities include meaningful N-word groups, phrases, simple sentences and compound sentences. A multigranular relational text structure is then constructed which incorporates the text entities. Output text is generated from the relational text structure using one or more entity grouping rules. The output text generated from the relational text structure conforms to predefined user constraints. The user constraints can include the volume of output text to be generated, a set of keywords to be reflected in the output text, and the level of generalization of the output text.

BRIEF DESCRIPTION OF THE SEVERAL VIEWS OF THE DRAWINGS

The foregoing summary, as well as the following detailed description of preferred embodiments of the present invention, will be better understood when read in conjunction with the appended drawings. For the purpose of illustrating the present invention, there is shown in the drawings embodiments which are presently preferred. It should be understood, however, that the present invention is not limited to the precise arrangements and instrumentalities shown. In the drawings.

DETAILED DESCRIPTION OF THE INVENTION

Figure 1:
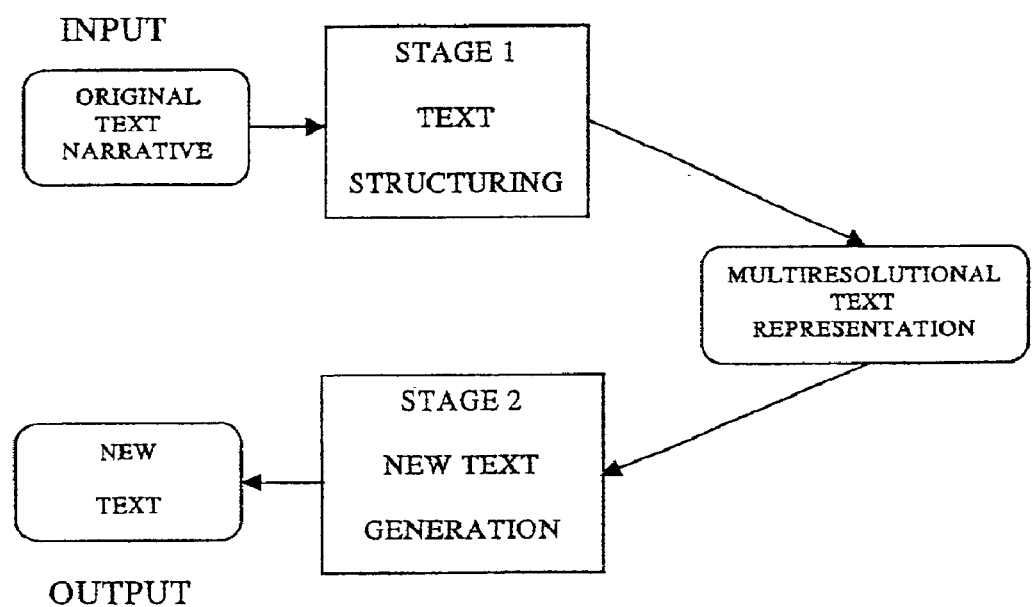
FIG. 1 is a flow diagram illustrating the two stages of text processing of an embodiment of the present invention.

Certain terminology is used herein for convenience only and is not to be taken as a limitation on the present invention.
Definitions
Multiresolutional—having multiple levels of resolution (e.g., words, groups of words, phrases, simple sentences); also known as multigranular or multiscalar.
Entity—a thing that has definite, individual existence in reality or in the text; something "real" by itself; something that exists as a particular and discrete unit; something that has separate and distinct existence and objective of conceptual reality; a token identifying a unique object in a database . . . and usually a unique object in the universe; each entity can preferably be equipped by fields of type, attributes, synonyms, related terms, visual images, parts that can be decomposed in, actions that can produce, actions that can be subjected to, and others.
Generalization—the operation of searching, focusing attention, and grouping to form a new entity.
Confirmed—refers to refers to words, groups of words, etc. which are marked after the process of verification, which ends with the convergence of the verification loop.

Encapsulated entity—refers to a text element (entity) which is considered as a unified whole or indivisible word and/or expression.

Natural dividers—tokens that separate objects of the text (e.g., the beginnings and ends of paragraphs, periods, commas, colons, semicolons, question and exclamation marks, ellipses).

Significance—a quantitative measure for each unit of text, the value of which can include the frequency of occurrence, the number of associative links, and the fitness to a user's needs.

Virtual dividers—tokens that separate the beginnings or ends of separate objects of the text (e.g., that separate simple sentences where the natural dividers or word dividers were intentionally or accidentally omitted).

Acronyms

BAP—before action part
AP—action part
AAP—after action part
POS—parts of sentence
RB—rule base
MD—main dictionary
UD—user's dictionary
IJD—idiomatic/jargon dictionary
PPD—prepositional phrase dictionary The present invention comprises a text processing system which preferably operates on a file of digitally coded text, analyzes the sequential strings of symbols of the text, and constructs a multigranular structure from the original text file. The system preferably uses rules based primarily on conventions used in various areas of text preparation (e.g., book publishing, press media, manuals and technical report preparation, Web page creation, composition of meeting minutes, scientific paper writing). Additional rules are learned (formulated) by the system from processing the text file. The most frequently used rules are incorporated into a rule base.

By constructing a properly organized text structure obtained from an original document, the system and method of the present invention can construct a variety of text structures which can, for example, encode in its meaning a set of nested and interrelated generalizations. In turn, the system can generate narrative text which can have different levels of generalization, focus of attention, and depth of detail.

During text structuring, each unit of text is tested using one or more algorithms of consecutive text processing, preferably including multigranular organization of text units, disambiguation of the text units, semantic network formation, and generalization. The results of the text structuring are used for generation of new text including annotations, summaries, abstracts, extended abstracts and abridged texts. Text structuring and text generation preferably use an interrelated set of rules.

In processing the text file, the system can consider the text as a system of letters, a system of phonemes, a system of syllables, a system of single words, or as many systems of larger segments consisting of groups of words. Each of these systems can exist simultaneously and can be associated or connected to each other by the relation of semantic nesting. The present invention is designed to process the text file (including forming and testing words and groups of words) to determine meaningful words or groups of words. The system can also detect simple and compound sentences which include meaningful groups of words. Various segments of the text including paragraphs, subsections, sections and major parts of the text, consisting of sentences, are also detected and their relationship/correspondence is determined. These portions or segments of text are referred to herein as text units. By associating text units of various resolution with each other, new texts can be generated which have a different degree of generalization. Thus, in processing the text file the system preferably considers the text at the following levels:

a) single words—each word having a particular field of meaning formed by a set of synonyms;
b) groups of words—the groups of words which tend to be together in the text so as to convey some particular or more general meaning for which a single word does not exist, or is unknown; these groups of words are referred to as "M-seeds" or seeds of meaning;
c) operational parts of a sentence—phrases which usually convey information about an actor, an action, and an object upon which the action is applied; the description of the actor precedes the description of the action and is referred to herein as a before action part or BAP; the description of action follows the BAP and is referred to herein as the action part or AP; following the AP is the after action part or AAP;
d) simple sentences—which contain complete statements which can include BAP-AP, AP-AAP, or BAP-AP-AAP combinations;
e) compound sentences—which include groups of simple sentences which convey a unified meaning;
f) paragraphs—which include groups of compound sentences and simple sentences which are related to each other and convey a joint message;
g) sections (subsections)—which comprise a unified part of the document content;
h) document—which comprises the unified content;
i) domain—which includes groups of documents.

The system can also consider the text at the level of phonemes.

The system and method of the present invention does not rely on conventional natural language grammar. Rather, the text structuring preferably involves the determination of a hierarchical structure of the text which has multiple levels of granularity and depth and does not directly coincide with the structure usually produced as a result of grammatical parsing.

Text processing for text structuring and text generation preferably includes the steps of forming a hypothesis and testing this hypothesis against the system of stored rules. As a result of hypothesizing and testing, a system of semantically nested generalizations can be created. A multigranular knowledge architecture is then created which includes the semantically nested generalizations and includes features of nestedness and the temporal strings of narrative inherited from the original text.

The system and method of text structuring of the present invention preferably applies a loop of entity recognition at each level of resolution to recognize an entity with some probability. The value of probability can be increased by the result of testing after applying the hypothesized entity at the adjacent level of resolution. Thus, the text structuring process incorporates top-down and bottom-up waves of recognition and testing that can converge, or diverge. If the entity recognition and testing converges, the entity is stored as part of the text structure. If there is divergence, a new hypothesis is introduced at the level of divergence.

Figure 6:
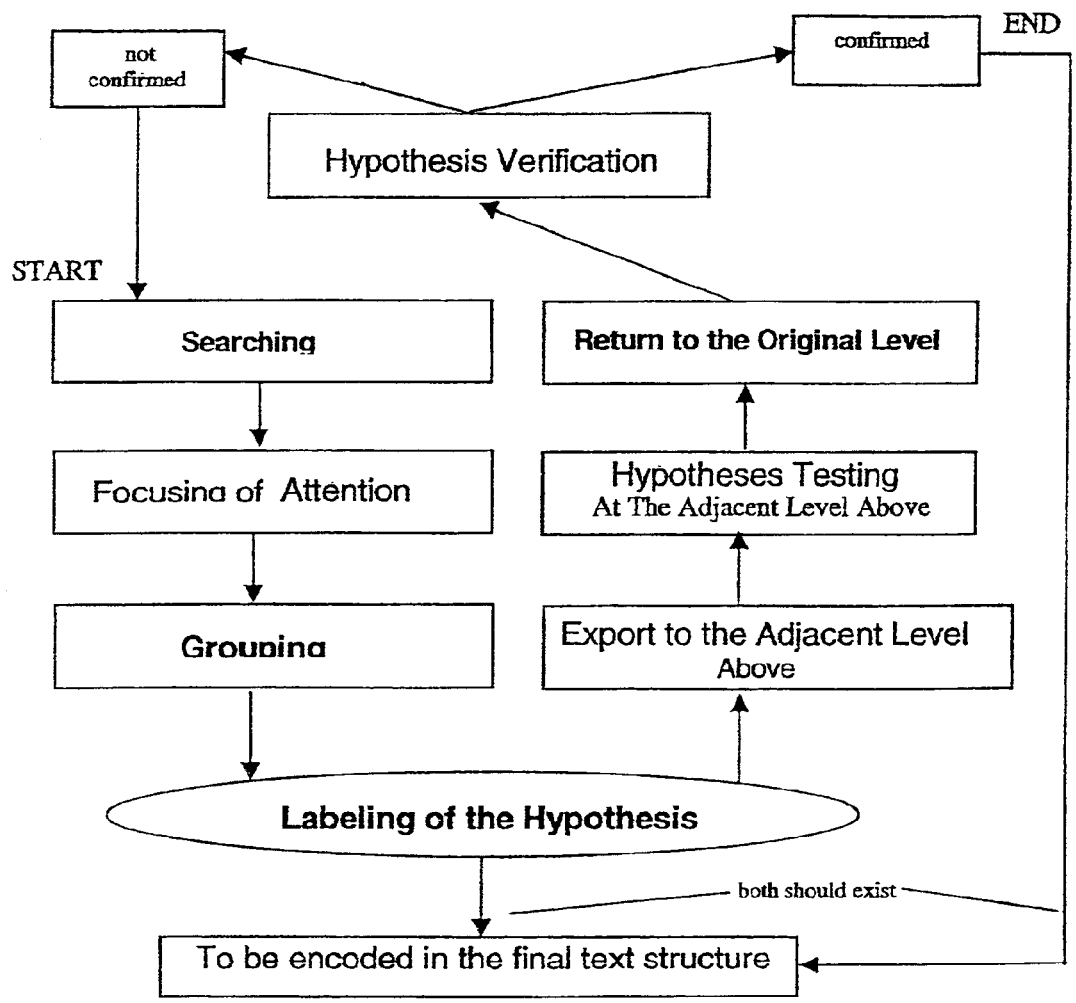
FIG. 6 is a block diagram of the disambiguation process of an embodiment of the present invention.

The algorithm of hypotheses testing will be discussed below with reference to FIG. 6. Formation of the hypothesis is shown on the left side of FIG. 6. Each procedure preferably earns points proportional to the probability (or likelihood, or belief) depending on the probability associated with the components (units of text upon which the procedures are performed). After the hypothesis is formed and labeled, it is preferably sent to the adjacent level of lower resolution where it is treated as a single unit of text with the probability measure attached to it. Use of the text unit may increase or decrease the convergence of hypotheses generating process at the level of lower resolution. In the case of increased convergence, the level of hypotheses origination receives a positive signal of verification result. If the rate of convergence is decreased, the hypothesis is considered not confirmed and the level of origination is informed correspondingly. While the steps shown on the left side of the FIG. 6 are being performed, the hypotheses are preferably arriving from the adjacent level of higher resolution and affect the result of convergence positively or negatively with the repercussions described above. The loop of hypotheses generation and verification preferably works uniformly at all levels of resolution.

The resulting text structure is preferably labeled by a domain hierarchy number, level number and entity number, and can thus be used as a provisional knowledge base of the text organization.

Text generation is based on the knowledge hierarchy stored within the overall architecture of the text representation. The method of text generation of the present invention preferably employs restoration of the narration traces at the corresponding level of generalization. Prior to output text generation, a set of conditions of consistency and connectivity are preferably satisfied, and a new narrative is generated that is different from the initial text by having the following features:

a) the level of text generalization is selected according to the assignment; the degree of generalization is determined by the number of the highest resolution level used; the importance of generalization for the user is determined by the value of the factor $k_G \leq 1$; generated text will have different levels of generalization depending on the degree of grouping (preferably determined by the coefficient of grouping $k_G$), degree of focusing attention (preferably determined by the coefficient of focusing attention $k_{FA}$) and the depth of descriptive detail (preferably determined by the coefficient of the depth of descriptive detail $k_{DD}$). The degree of grouping is preferably determined by the level of the multiresolutional hierarchy of knowledge from where the sequence of text units is taken. The degree of focusing attention is preferably determined by the constraints upon unit selection formulated in the assignment on text generation and the depth of descriptive detail is preferably determined by the number of additional levels of higher resolution from where the additional text units are taken.

b) the depth of the descriptive details at a particular level of generalization is provided according to the assignment by enriching the text with associative connections stored in the structure of the text; the importance of descriptive details for the user is determined by the value of the factor $k_{DD} \leq 1$.

c) the semantic focus of attention is provided by assigning the level of details biased quantitatively according to the assigned direction of interest; the importance of generalization for the user is determined by the value of the factor $k_{FA} \leq 1$.

d) the total final volume of the required narrative is provided by constraining the total number of words in the narrative under condition of keeping the required proportion $k_G:k_{DD}:k_{FA}$ so that $k_G+k_{DD}+k_{FA}=1$.

The system and method of the present invention provides for structuring of text and text generation that can be used as a substitute for the original text. Output text can be generated having a required volume, a level of generalization, a degree of details, and a definite focus. The system and method may also include generation of a graphical representation of newly generated text.

The following text processing routines are preferably used with the system and method of the present invention:
a) frequency analysis;
b) evaluation of the association strength of the text units and their associations;
c) construction of tentative groups of words (N-words or M-seeds (seeds of meaning)); and
d) syntactic parsing.

Each of these routines is preferably used in the process of constructing the multiresolutional text structure.

Text structuring and text generation preferably occur in two stages. The first stage includes the transforming of the original text into the multiresolutional architecture of knowledge representation. The second stage includes generation of new narrative text from the multiresolutional representation of text knowledge. This process is illustrated in FIG. 1.

Extracting the multiresolutional (multigranular, multiscale) structure (nested hierarchical architecture) of text units (entities) from the text is a prerequisite to transformation from the narrative representation into the relational architecture of knowledge. A main dictionary is preferably used for the initial interpretation of the units of text, and new domain dictionaries are formed for the text narrative (original text) together with its structure of text representation as a part of the text analysis. The multiresolutional hierarchy of the structure of text representation consists of the units which lump together elements of the text that have emerged due to the speech legacy grammar.

Because of the "laws of narrative," speech is most useful as speech and not as useful as the mechanism for knowledge representation. The words and/or groups of words that should be situated in one location in the knowledge base are distributed in the text and are repeated several times instead of just having several pointers leading to the same memory location. Not only can speech grammar carry the legacy of the narrative but the speech-appropriate words that must be substituted by their real carriers of meaning.

The "laws of narrative," that lead to distributed repetition over the narrative of the labels for the same entities, could be also called "laws of speech generation," or "rules of oral speech construction." These laws are the grammar of speech which have been inherited from speech, and is thus referred to 25 speech legacy grammar.

A multiresolutional hierarchy allows for minimizing the complexity of texts by properly selecting the optimum number of resolution levels.

Since the transformation of the original text into the structure of text representation can be accomplished through incremental generalizations within the original text, building the vocabulary of the original text is preferably performed prior to the subsequent structure of text representation construction.

The vocabulary of the original text is a list of "speech-legacy" words that are symbols for encoding entities of the real situations and can be represented by single words, as well as by groups of words. As discussed above the speech-appropriate (narrative-appropriate) words and expressions are preferably substituted by the real carrier of meaning when the knowledge organization is construct. For example in the following sentences: "Such a scenario is far off, despite the hoopla generated by Wall Street and Hollywood. Widespread usage of robots in industry has not yet occurred. In fact, there are only 6000 robots at work in America today. Existing technology is not versatile enough to make work any easier, or any more efficient, Tesar says." "Such a scenario" is preferably qualified as a pointer to the prior description of the scenario. Quote marks could be one of the possible indicators of the sentences that should be lumped together as a "scenario." "Far off" is preferably substituted to "remote" and/or "distant." "Hoopla" is preferably substituted by "commotion," or "excitement," or "excessive publicity." "In fact" or "indeed" is preferably not used as a unit of text in the knowledge base because it carries the only meaning to indicate that the sentence "there are only 6000 robots at work in America today" is confirming the previous sentence: "Widespread usage of robots in industry has not yet occurred." "Tesar says" is preferably considered as a pointer that refers the unit of knowledge to the source but should not be considered as an independent source of knowledge (it is a "reference pointer").

The above example shows that there are elements of the text that are preferably considered the legacy of the "laws of narrative" but do not contain any units of "knowledge" that should receive a memory location in the collection of "meanings" that are collected in the knowledge base.

Figure 2:
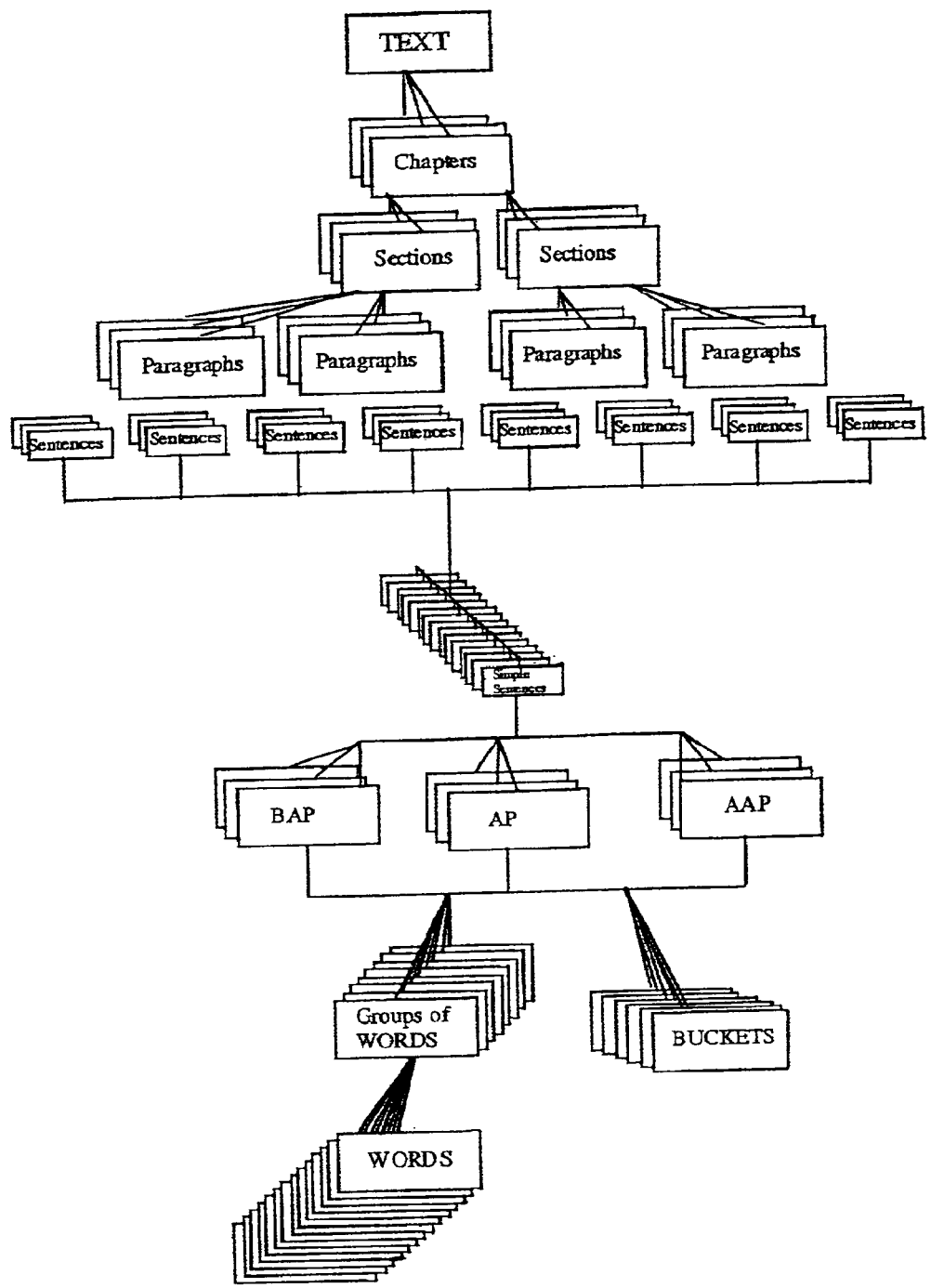
FIG. 2 is a diagram showing a structure of text representation of an embodiment of the present invention.

For each original text file, the results of text structuring are preferably organized in a hierarchy shown in FIG. 2. Test processing oriented toward multigranular structuring is preferably organized in a two stage fashion. The stages are preferably performed at a particular granularity. If more than one granularity is registered for a particular text, the stages are performed are each level of granularity. For a given text, a browsing operation is performed so that single units of a particular level of resolution can be tested for a variety of the group forming phenomena. The following are some examples of group-forming phenomena:

a) natural division that provides easily detectable tokens of structuring starting with "chapters" and ending with "sentences";
b) frequent spatial adjacency in the text demonstrating the possible carrying of a particular meaning; frequently repeated word combinations are considered as possible carriers of meaning;
c) "object" or "subject" relevant groups of words are preferably spatially distinguished from the "action" relevant groups of words; if "nouns" and "adjectives" are swarming together linked with particular rules of grammatical parsing, they can be unified into an Actor (before-action parts, BAP), or Object-of-action related groups (after-action part, AAP); if "verbs" and "adverbs" fit within grammatical rules of teaming for action description (action part, AP), the action-related groups can be formed.

Figure 3:
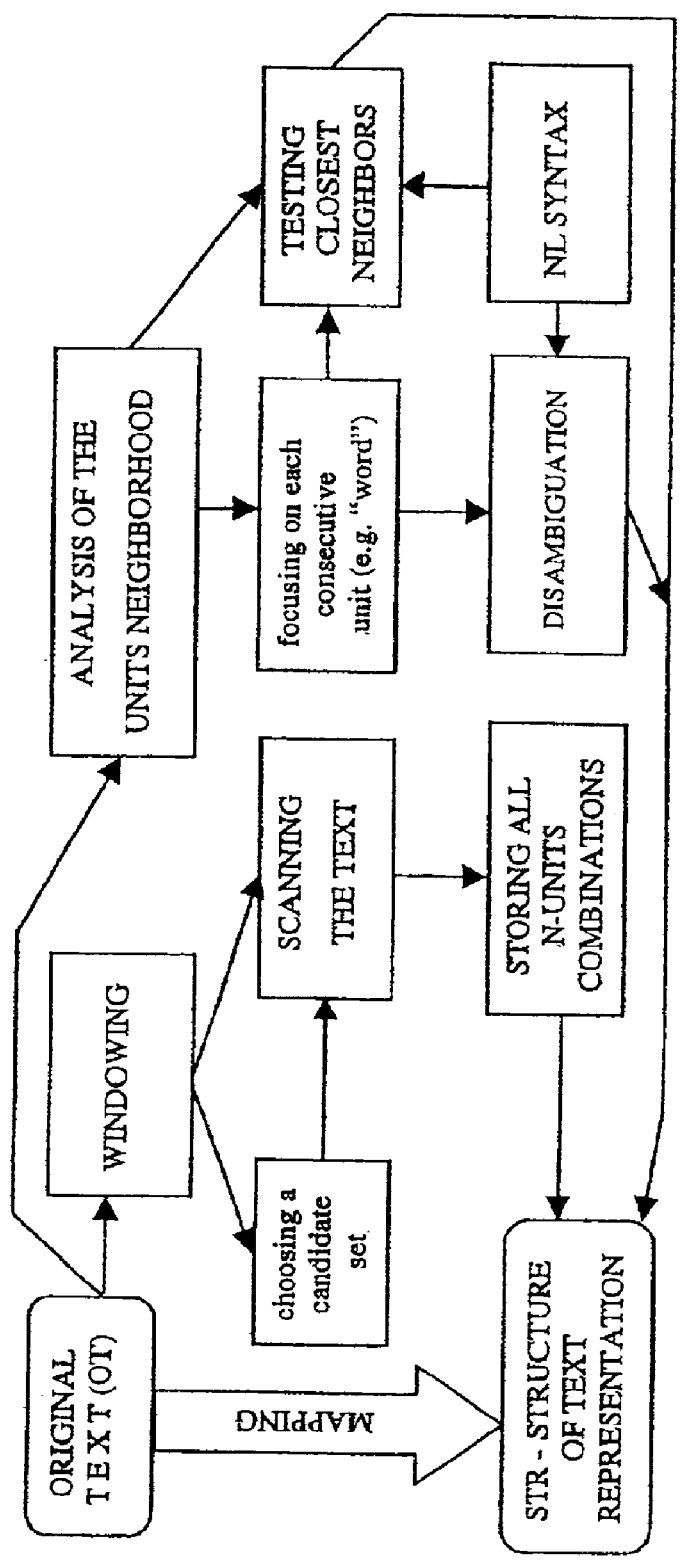
FIG. 3 is a block diagram of the group hypothesizing and text structuring process of an embodiment of the present invention.

FIG. 3 illustrates the group hypothesizing process of one embodiment of the present invention. As shown in FIG. 3, windowing and neighborhood analysis are performed on the original text. The process of windowing allows for finding frequent (potentially meaningful) N-word combinations (some of which will be determined to be meaningful, referred to herein as M-seeds). Neighborhood analysis serves to analyze, with the help of syntactic rules, grammatical couples such as adjective-noun/pronouns, nouns-(proposition)-subordinate nouns, and helps to disambiguate difficult cases. As a result, a relational text structure is created. Some areas of the text structure may remain unclear. Processing at adjacent levels is preferably performed to reduce the amount of unclear labels on words and their relationships.

The process of group hypothesizing, as applied to the level of words, results in a new level of generalization having units of pairs of words and/or triplets of words, etc . . . (N-groups of words and/or M-seeds), that differ by the value of their significance. The value of significance is preferably computed as a product of measures for the frequency of the group, its connectedness to other frequent groups, and its importance for the assignment (how much it is connected to the key words of the user's assignment). The next level of generalization is preferably combined by further lumping the groups into formations such as segments that have a meaning (e.g., being an actor, or action description, or the object upon which the action was directed). Group hypothesizing is preferably performed at this level as well, resulting in simple sentences that are sets such as BAP-AP-AAP, BAP-AP, or others. Group hypothesizing is continued at the paragraph, section, chapter, etc. levels.

Figure 4:
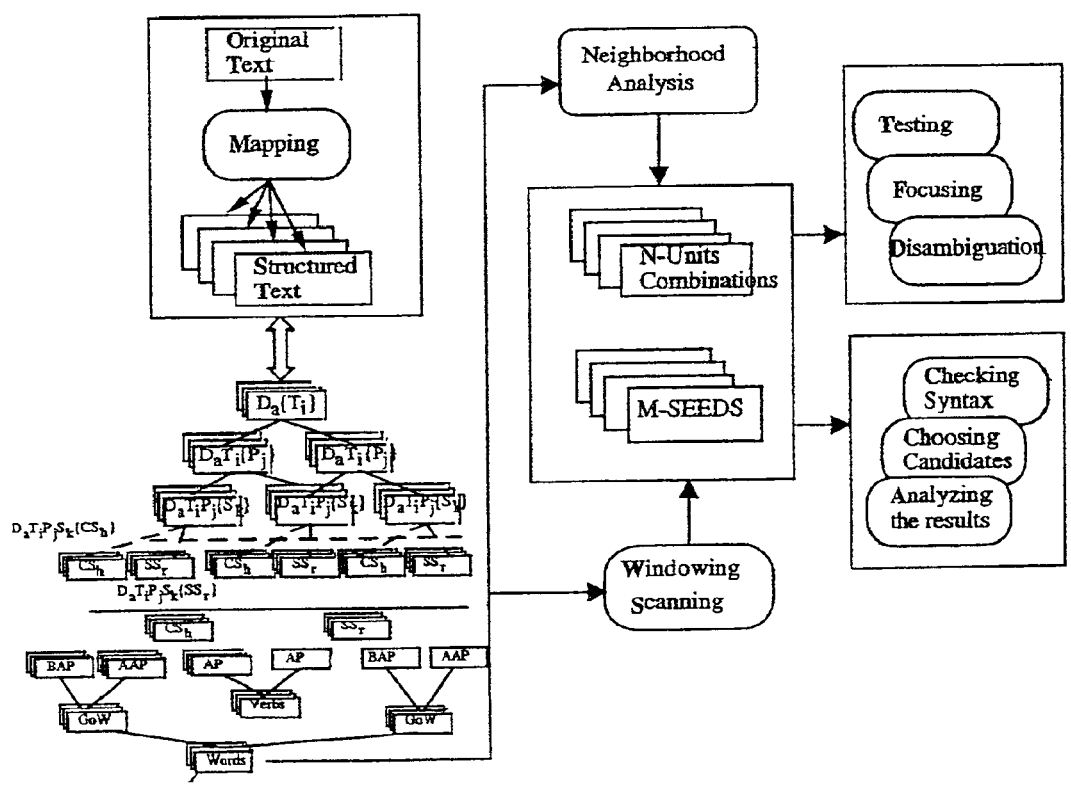
FIG. 4 is a block diagram showing the text structuring process as part of the overall text processing system of an embodiment of the present invention.

FIG. 4 shows the group hypothesizing process of FIG. 3 as part of the overall text processing system of a preferred embodiment of the present invention. The notation of FIG. 4 should be interpreted as follows:

$D_a\{T_i\}$—the document $D_a$ containing the set of its sections $T_i$; i=1, . . . , n; n-total number of sections;

$D_a T_i\{P_j\}$—the document $D_a$ with a particular section $T_i$ containing the set of its paragraphs $P_j$; j=1, . . . , p; p-total number of paragraphs in this section;

$D_a T_i P_j\{S_k\}$—the document $D_a$ with a particular section $T_i$ with a particular paragraph $P_j$ containing the set of its sentences $S_k$; k=1, . . . , d; d-total number of sentences in this paragraph;

$D_a T_i P_j S_k\{CS_h\}$—the document $D_a$ with a particular section $T_i$ with a particular paragraph $P_j$ with a particular sentence $S_k$; containing the set of compound sentences in it $\{CS_h\}$ where h=1, . . . , t; t-total number of compound sentences, usually, this number is 1;

$D_a T_i P_j S_k\{SS_r\}$—the document $D_a$ with a particular section $T_i$ with a particular paragraph $P_j$ with a particular sentence $S_k$; containing the set of simple sentences in it $\{SS_r\}$ where r=1, . . . , u; u-total number of simple sentences, usually, this number is from 1 to 4;

$D_a T_i P_j S_k\{G_t\}_q$—the document $D_a$ with a particular section $T_i$ with a particular paragraph $P_j$ with a particular group t of q words in it $\{G_t\}_q$; t is the number of groups;

$D_a T_i P_j S_k\{M_s\}_m$—the document $D_a$ with a particular section $T_i$ with a particular paragraph $P_j$ with a particular group m of s words in it $\{M_s\}_m$; m is the number of groups; for each of these groups the value of significance $\Sigma$ is computed.

Cases of confirmation or rejection for a particular hypothesis are collected so that for a multiplicity of cases, a final decision can be made whether a hypothesis should be confirmed or rejected. Labeling of the hypotheses is preferably performed provisionally. However, after statistical confirmation, a hypothesis can be permanently included in the domain dictionaries. The hypothesis can then be manipulated as an entity and can participate in the functioning of the information processing system.

Figure 5:
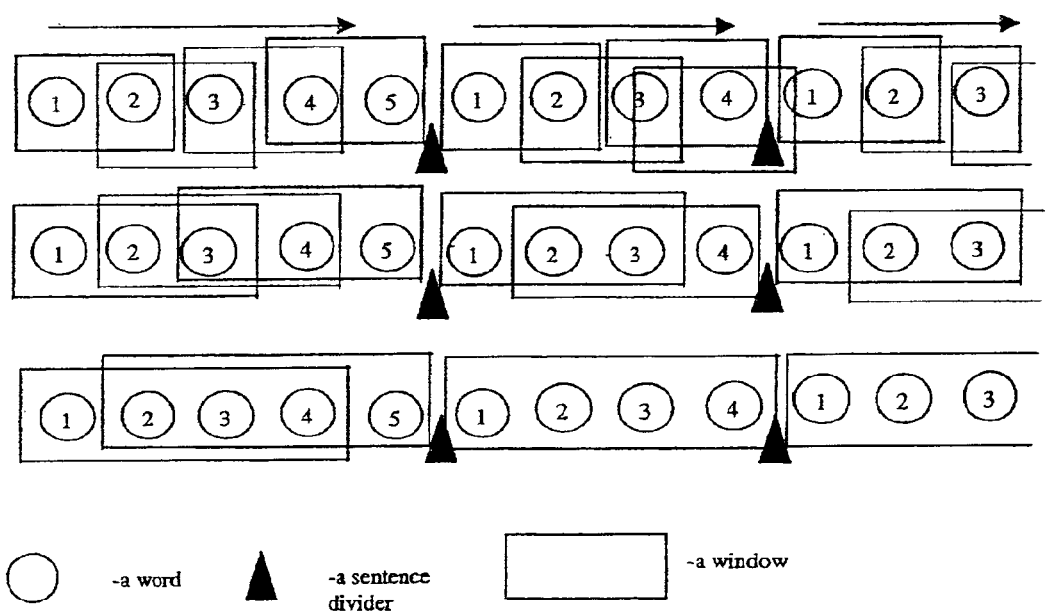
FIG. 5 is an illustration of the windowing and scanning process of an embodiment of the present invention.

FIG. 5 illustrates the operations of windowing and scanning shown in FIG. 3. Windowing and scanning are important for detecting N-word groups, $\{G_t\}_q$, and M-seeds, $\{M_s\}_m$. Groups are preferably tested by using a rule base that detects N-word groups having relationships of the type: adjective with its noun, main noun-proposition-subordinate noun, and others. This refinement is an important part of finalizing the text structure.

The process of windowing allows the system to focus its attention within a specific scope. The sliding strategy of moving the window of attention is preferably assigned in such a way as to provide efficient investigation of all scopes of interest. This strategy can be varied for constructing different models (e.g., scan in a parallel manner; provide a particular law for scanning; or take random samples from different zones of the scope of interest). The strategy selection preferably depends on needs, hardware tools, and resources available (e.g., processing time available).

The system and method described above is capable of transforming a narrative (a temporally arranged linguistic object) into a non-temporally arranged architecture. Maintaining a record of the original narrative is important since it is preferred that the sequencing legacy of the original narrative is maintained in the output text.

According to one embodiment of the method of the present invention the following steps are used to develop the text structure.

a) Preliminary text tagging—a preliminary tagging of paragraphs, sentences and phrases; compound sentences are divided into simple sentences.

b) Hypothesizing the functional segments—determining the actor, the action developed by the actor and the object or system to which the action is applied for each sentence.

c) Evaluating the veracity of the functional segments—determining whether the action description is associated with the verb or verb-phrase and is situated somewhere in the middle of the sentence, and whether the actor description (which will be called the object (subject) represented within the before action part of the sentence) precedes the action description, and whether the action description is succeeded by the description of the system to which the action was applied (which will be called the object (subject) represented within the after action part).

d) Storing the sequential flow database—establishing the sequential flow database, finalizing the interconnection of functional segments and their values; each paragraph of the text, each sentence in this paragraph, each phrase in the sentence, and each word in the phrase is preferably tagged; each BAP, AP and AAP is found and tagged in each phrase as well as each word within each phrase.

e) Finding meaning conveying substructures—knowledge units of high resolution convey meaning linked with object description, object properties, action description, action properties. When the high resolution units are unified into structures the meaning conveyed by these structures gets more complicated: it describes effects of one object upon another (for some result), or an object-result is achieved via interaction registered among objects (subjects). As the structures are generalized they become objects and actions of the lower resolution, and the structures convey the meaning of their interaction and/or existence. To find meaning, means to determine what is the object (subject) that acts, how does it act (what does it do), upon which object (subject) does it act, and what is the result of the action. Other cases of finding out the meaning are related to the cases when we determine a) what are the properties of an object, b) what are the capabilities of the object, c) what are the results of action, and so on.

f) Introducing generalized actions—completing the primary generalization by substituting the AP's into generalized AP's using a special vocabulary of generalized actions in which a correspondence is shown between real verbs and generalized verbs.

g) Construction of the nested relational network—determining the elementary structures which form a relational network by establishing connections between overlapping BAP's, overlapping generalized actions and overlapping AAP'S; cases of overlapping are preferably determined by N-gram analysis which allows for remembering the locations of N-word combinations in a sequential flow database.

h) Using the newly introduced substructures for enriching the adjacent generalized level of representation—the new substructures are preferably generalized into new entities (objects) and new relations (linkages between the objects). The entity relational network preferably describes a situation at the level at a particular moment of time. By comparing this situation with the situation at the next moment of time, changes that happen are recognized and can represent the actions that are being performed (and/or executed). The generalized units of entities and actions are preferably submitted to the lower level of resolution where they become elementary units of knowledge. Similar processes preferably occur between each pair of adjacent levels from the bottom-up.

The system and method of the present invention provides top-down and bottom-up waves of text processing for disambiguation. In processing the text, disambiguation is needed at each level of resolution for the following reasons;

a) no single word has a unique meaning and interpretation; the meanings are multiple, and thus, the interpretation is vague; the well-known properties of synonymy and polysemy leave substantial influence upon the effect of ambiguity;

b) no pairs (or triplets) of words with its relations of subordination (such as adjective-noun, or noun-preposition-noun) can be interpreted exhaustively: the context affects the results of labeling;

c) no M-seed has a single labeling initially: their significance factor is determined because of a variety of reasons that can be found only after thorough analysis;

d) key phrases for finalizing the results of text structuring, BAP, AP and AAP, cannot be determined unequivocally from the beginning; they can be clarified only as a result of repeating the disambiguation process;

e) simple sentences cannot be discovered and labeled without trial and error.

The process of searching for the most valid hypothesis preferably runs simultaneously at all levels. FIG. 6 illustrates the disambiguation process loop for a single level. Searching (scanning and windowing) is used to find candidates for hypothesis generation based upon the dictionary and the library of rules. Groups of words are created and hypotheses are formulated and tested at the adjacent level above. As a result, hypotheses of the level below can either be confirmed or not confirmed.

The processes of hypotheses testing demonstrated in FIG. 6 preferably proceed as follows. The entity-relational network assembled at a level by connecting elementary information units is the background source for the process of hypotheses generation. Formation of the hypothesis is shown in the left part of FIG. 6. The procedures of search, focusing attention and grouping are preferably performed consecutively and/or jointly.

Searching is preferably performed by using a "sliding window." The width of this window determines the focus of attention during a particular run. If a meaningful group of words is found within a string of words in the window, the hypothesis is proposed concerning this group of words. Examples of hypotheses include: consider a BAP, consider AP, consider AAP, consider an M-seed, consider an object, consider a couple "adjective-noun," and the like.

While performing the search, focusing attention, and grouping procedures, each procedure preferably assigns to its results some number of points proportional to the probability (or likelihood, or belief) to form a group. This probability preferably depends on the probability associated with the components (units of text upon which the procedures are performed).

After the hypothesis is formed and labeled, the hypothesis is preferably sent (exported) to the adjacent level of lower resolution ("level above") where it is treated as a single unit of text with the probability measure attached to it. Use of this text unit may increase or decrease the convergence of hypotheses generating process at the level of lower resolution. This is "hypothesis testing" at the adjacent level above. In the case of increased convergence, the level of hypotheses origination receives a positive signal of verification result. If the rate of convergence is decreased, the hypothesis is considered not confirmed and the level or origination is informed correspondingly.

For the left side of FIG. 6, the hypotheses are arriving from the adjacent level of higher resolution (from the level below). These hypotheses are considered to be elementary units of knowledge and are preferably incorporated in the entity-relational network of the level. The hypotheses affect the result of convergence positively or negatively with the repercussions described above. The loop of hypotheses generation and verification preferably work uniformly at all levels of resolution.

Figure 7:
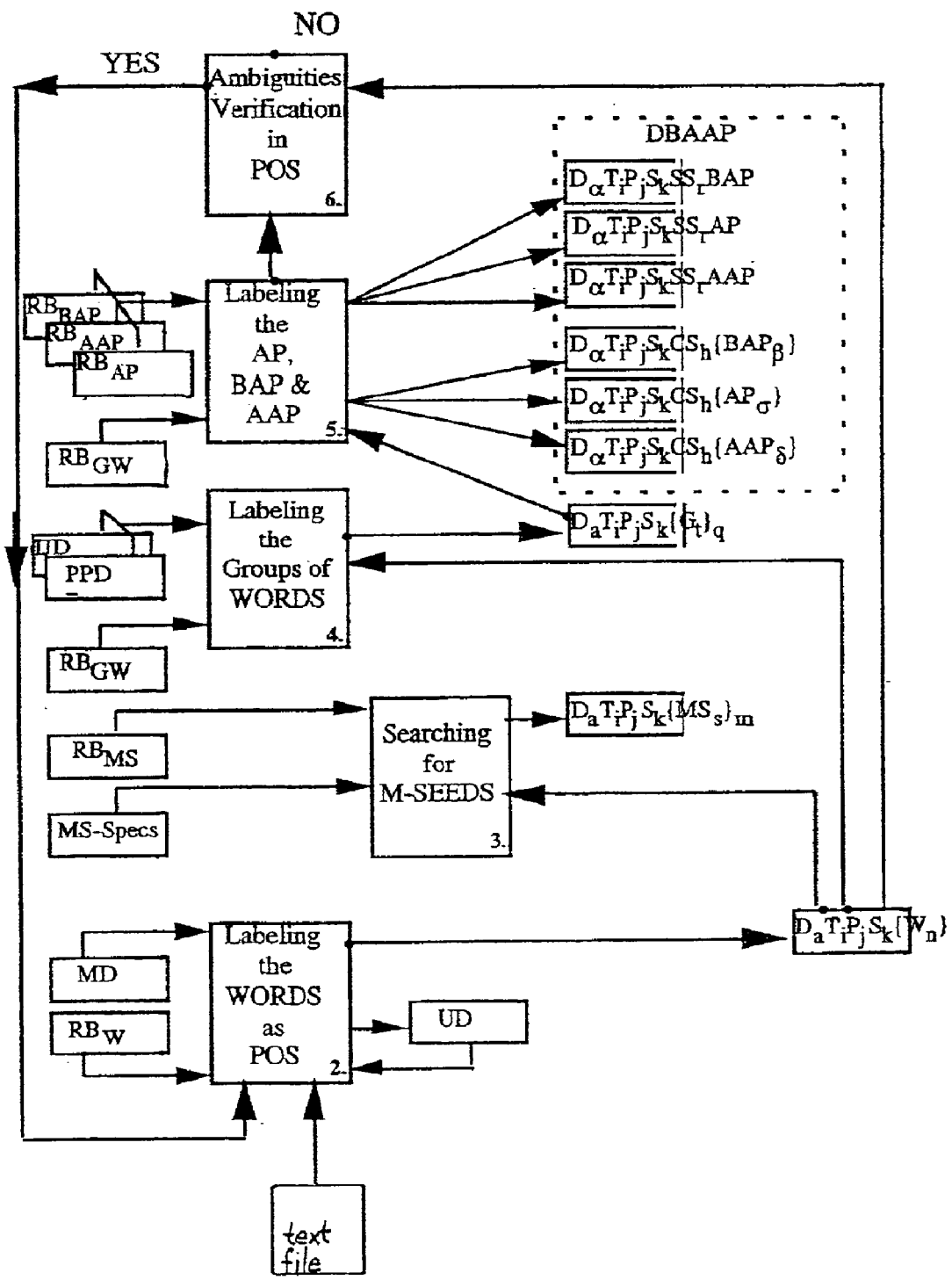
FIG. 7 is a detail flow diagram of the process of hypothesizing and verification of an embodiment of the present invention.

The process of generalizing the units of each level by applying a grouping focusing attention-searching set of operators can be executed as s system of parallel processing. FIG. 7 shows a recursive loop which runs through all levels until the process converges in the whole hierarchy.

The following steps of bottom-up formation of hypothesis and top-down verification of the hypotheses is preferably applied as the self-organizing automated process of organizing texts into the multiresolutional structure:

a) Searching—text units of a higher resolution level are browsed with units of a lower resolution level to test the possibility of combining them together into meaningful groups;

b) Focusing attention—the groups are evaluated to focus attention on a group which has maximum validity; different clues are used at various levels for determining the scope of interest; clues are not unique and the list of clues can change depending upon a user's preference; focussing attention preferably involves limiting the number of words (or sentences) considered at each moment of time. The procedure of focussing attention preferably reduces computational complexity and makes the algorithms applicable in practice. Assigning the width of the window is preferably done based upon some clues of analysis collected from prior experience. When the width of the sliding window is 3 words, two pairs of consecutive words can be analyzed at each moment in time, and hypotheses of their relationships can be formulated. In addition to clues, the "validity" of word combinations found by searching is preferably considered. For a window with a 5-word width, a judgment can be formulated about four couples, three triplets and two quadruplets. A 5-word window cannot, however, analyze sentences with less than five words. When the couples, or triplets of words are analyzed, the validity (evaluation of significance) of these couples and/or triplets is preferably determined by evaluating frequency of words in the text, frequency of having similar combinations, links between these combinations and other words of the text, etc. The value of significance allows for ranking the couples and triplets and the selection of couples and/or triplets having a value higher than some particular threshold.

c) Grouping—an entity of a group is formed whose meaning allows it to be exported to an adjacent level; the entity is now treated as a hypothesis and communicated to the adjacent level above for further exploration;

d) Exporting to the adjacent level—once an entity is exported to the adjacent level, the process of disambiguation shown in FIG. 6 is initiated again;

e) Return to the adjacent level of origination—when a hypothesis satisfies the rules of consistency, the loop process stops; the process is considered to have converged and the validity of the text unit is considered confirmed.

Figure 8:
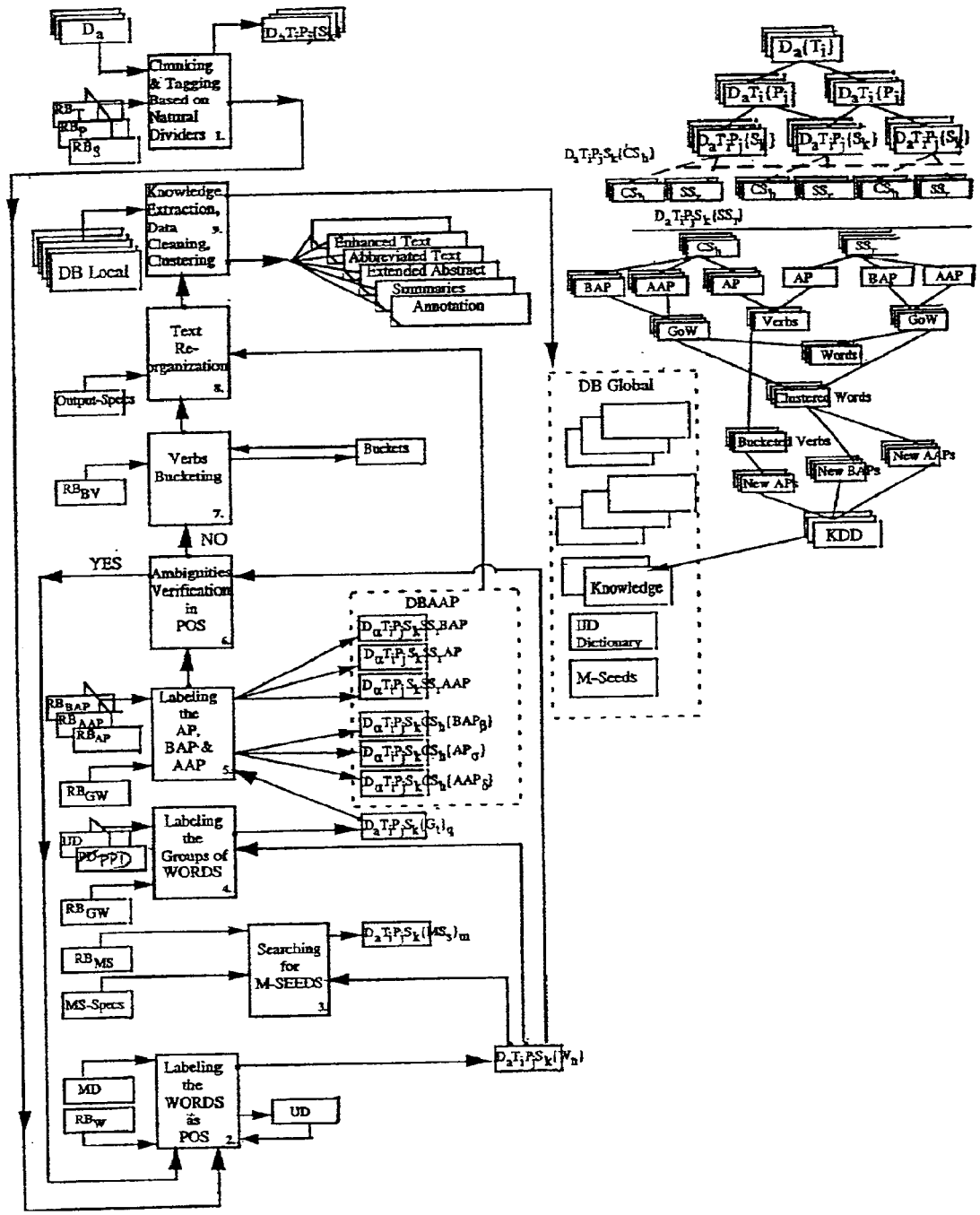
FIG. 8 is a flow diagram illustrating the text structuring procedure of an embodiment of the present invention.

Thus, at each level, both hypothesizing and verification is preferably executed simultaneously, as shown in FIG. 8.

Figure 9:
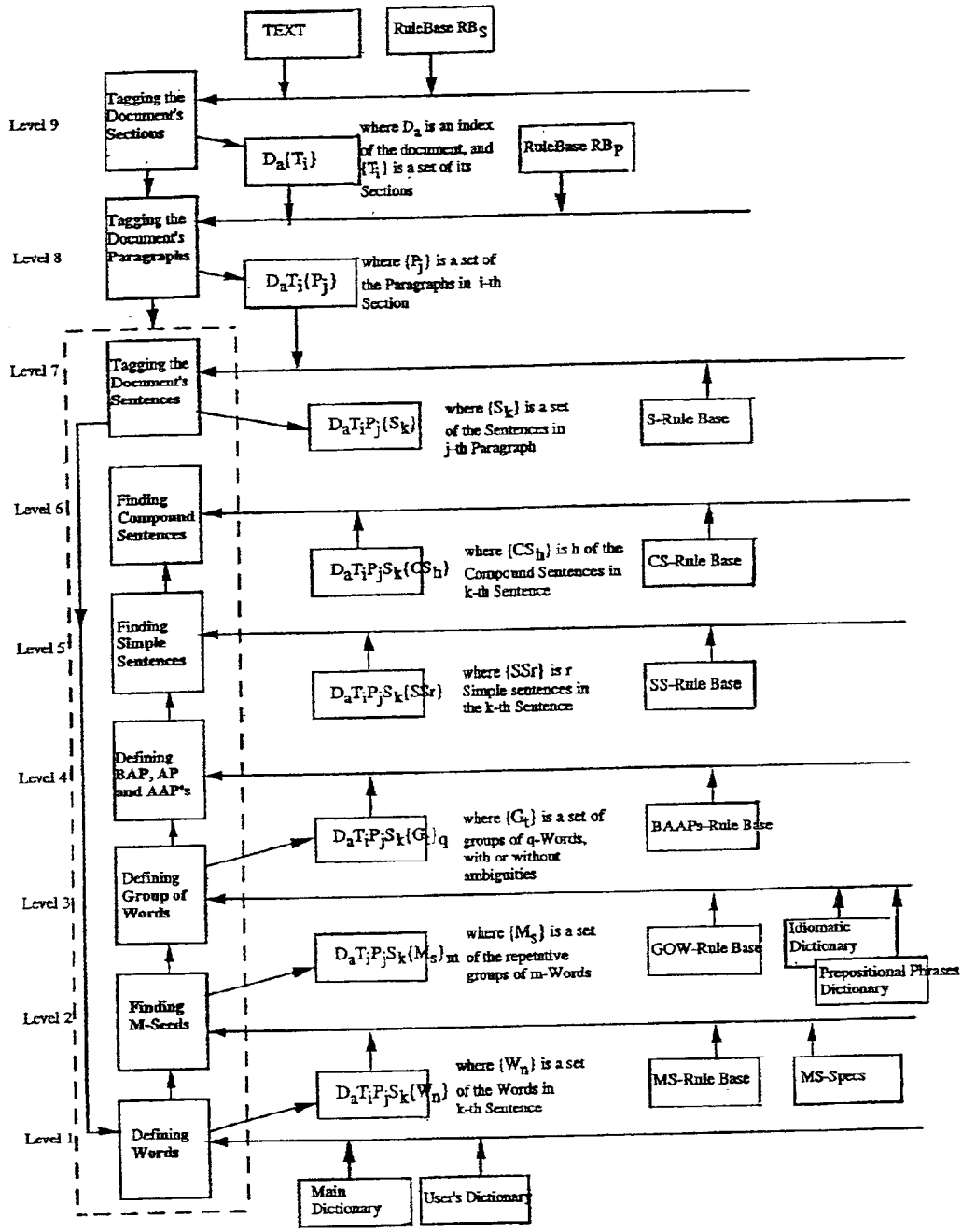
FIG. 9 is a flow diagram illustrating the top-down/bottom-up process for disambiguation of an embodiment of the present invention.

The top-down/bottom-up wave of processing for disambiguation is illustrated in FIG. 9 and contains processing in which the system:

a) hypothesizes and/or tests the arriving hypothesis about the meaning of a knowledge domain (group of documents); stores the hypotheses and submits them to the adjacent level of higher resolution or stores the hypotheses in the knowledge base;

b) hypothesizes and/or tests the arriving hypothesis about the meaning of a document (groups of sections); stores the hypotheses and submits them to the adjacent level of higher resolution (see level 9);

c) hypothesizes and/or tests the arriving hypothesis about the meaning of sections or subsections (groups of paragraphs); stores the hypotheses and submits them to the adjacent level of higher resolution (see level 8);

d) hypothesizes and/or tests the arriving hypothesis about the meaning of paragraphs (groups of compound and simple sentences); stores the hypotheses and submits them to the adjacent level of higher resolution (see level 7);

e) hypothesizes and/or tests the arriving hypothesis about the meaning of compound sentences; stores the hypotheses and submits them to the adjacent level of higher resolution (see level 6);

f) hypothesizes and/or tests the arriving hypothesis about the meaning of simple sentences (groups of BAPs, APs, and AAPs); stores the hypotheses and submits them to the adjacent level of higher resolution (see level 5);

g) hypothesizes and/or tests the arriving hypothesis about the meaning of BAPs, APs, and AAPs (groups of M-seeds); stores the hypotheses and submits them to the adjacent level of higher resolution (see level 4);

h) hypothesizes and/or tests the arriving hypothesis about the meaning of M-seeds (groups of one or more words); stores the hypotheses and submits them to the adjacent level of higher resolution (see level 2);

i) hypothesizes and/or tests the arriving hypothesis about the meaning of words found in the dictionaries at this level; stores the hypotheses and/or submits them to an adjacent level of higher resolution (see level 1);

The diagram in FIG. 9 demonstrates how the process of hypotheses generation and disambiguation (see FIG. 6) can generate the waves of top-down and bottom-up processing. Since the text (or the set of texts) is the initial source for all subsequent procedures and processes, the first discussion in steps (a) through (i) are performed top-down while all subsequent processing is preferably done in both directions simultaneously as demonstrated by FIG. 6. Thus, step (1) of the above description is related to the system as a whole and initiates processes in the system by entering Level 9 from above. The titles of levels explain the sequence of top-down decomposition of the text into a hierarchical (multiresolutional) knowledge base.

After level 7—Tagging the Document's Sentences, the document is submitted to level 1 as a collection of words for bottom-up processing.

Starting with Level 1, the groups of words are preferably being generated to form more generalized units of knowledge until the sentences and compound sentences could be formed. From level 1 up to level 7 and from level 7 down to level 1 the processing is preferably done in the hypotheses generation and hypotheses-confirmation fashion as shown in FIG. 6. Initially N-word groups are created and interpreted as matching words (like "adjective with the noun"). More salient N-groups are then generated that can be validated as M-seeds by the value of their "significance." BAP, AP and AAP are then recognized. Finally, the simple, and then, compound sentences are recognized. Between M-seeds and BAP-AP-AAP, other grouping can be anticipated.

Output Text Generation

Output text preferably conveys the context of the original text presented at various levels of generalization and compression. Preferably, a user can request the generation of output text having a particular level of generalization and can select the total output volume of the output text and the attentional bias toward a particular actor(s) or subject(s).

Traces of the original text document(s) are preferably stored in a database as sets of pointers from one word to another (at the level of words), from one group to another (at the levels on N-groups of words and M-seeds), from one segment to another at the level of segments (BAPs, APs, and AAPs are referred to as segments), from one sentence to another (at the level of sentences), etc.

Output text is preferably generated by combining relevant text units (text units that are marked by the pointers of the document trace) belonging to a requested level of generalization and satisfying constraints determined by the values of significance, or determined by a pre-assigned bias outlined by particular interests or goals of a user. A flow diagram illustrating the process of top-down output text generation is shown in FIG. 10.

Figure 10:
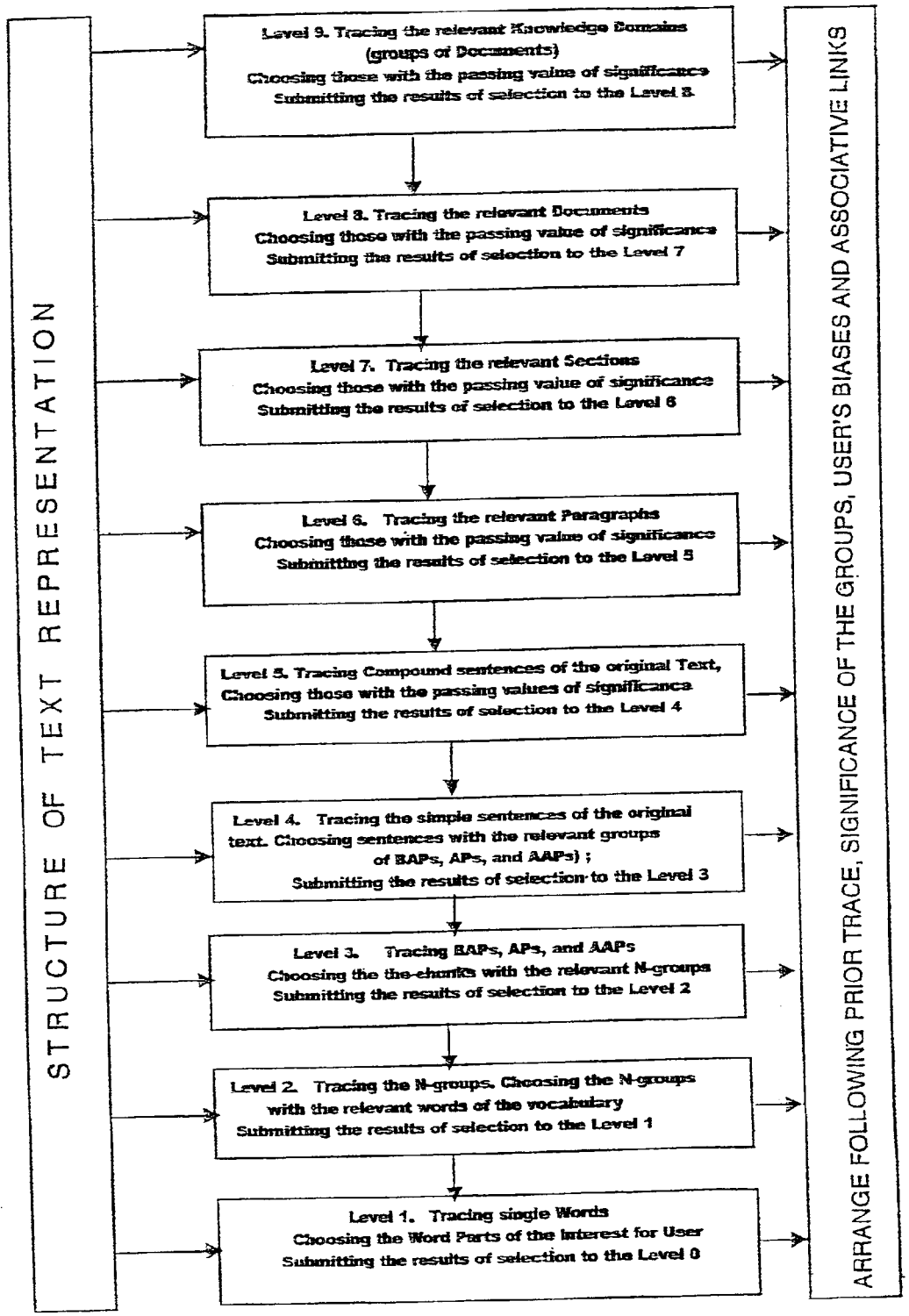
FIG. 10 is a block diagram of the output text generation process of an embodiment of the present invention.

As can be seen in FIG. 10, the process of output text generation starts with determining the relevant knowledge domain (groups of documents). This invokes related supporting components of the system including knowledge bases and dictionaries. If more than one knowledge domain is involved, traces of the knowledge domain guide the subsequent processing at the higher levels of resolution. The results of tracing are submitted to level 8. Level 8 allows for tracing the relevant documents if more than one related document is being processed. The system chooses the documents with passing values of significance. The results of tracing are submitted to level 7. At level 7, tracing of the relevant sections is performed by using the pointers generated during text structuring. The system preferably chooses the sections with the passing value of significance. The subset of sections to be used is submitted to level 6 where tracing the relevant paragraphs is performed. Paragraphs to be used for output text generation are selected by thresholding the passing value of significance. The results are submitted to level 5 for further processing. If the desired level of abridgement is satisfied at this point, the set of relevant paragraphs can be submitted to the output as a final result of the text processing.

Traces of relevant compound and simple sentences are found by processing the traces stored at level 5 and 6. These sentences can be submitted to the output if no additional information needs to be taken into consideration. This results in a more compressed abridged document at the output. Level 5 and 4 lead to a more thorough processing toward further compressing of the results. Tracing compound sentences of the original text allows for choosing text units with passing values of significance. After submitting these results to level 4, the system is able to trace the relevant simple sentences of the original text by using corresponding pointers. As a result, the sentences with the selected groups of BAPs, APs, and AAPs arrive to level 3, and the system starts the process of constructing the new text at this level.

At level 3, the segments of BAP, AP, and AAP can be put together under several strategies of output text generation. Some of the preferred examples of strategies for output text generation which can be used with the present invention include:

a) Order following—connects sentences obeying the order of their appearance within the original text;
b) Handshaking by M-seeds—connects sentences that contain the same significant M-seed in the AAP of the previous sentence and in the BAP of the subsequent sentence; overrules the natural order of sentences;
c) Handshaking by the subject—connects sentences that contain a particular subject in the AAP upon which the AP acts of one sentence with a subsequent sentence having the same subject as an actor within the BAP;
d) Sheaving BAPs—sheaving sets of sentences which contain BAPs with the same actor regardless of the location of the sentence in the original text;
e) Bundling AAPs—bundling a set of sentences which contain AAPs with the same subject/object which the action is directed, regardless of the location of the sentence in the original text;
f) Bucketing APs—bringing sentences together which contain APs having a verb belonging to the same bucket (a cluster of verbs with a similar meaning) regardless of the location of the sentence in the original text.

At level 2, tracing of the N-groups is performed. The system chooses the N-groups with the relevant words from a list of user defined key words. After the relevant N-groups are captured, the system submits the results of the selection to level 1.

At level 1, the process of text generation ends (if the user does not require providing for a particular phoneme or grammatical word part). The output can also be presented in the form of a pictorial diagram.

The following is an example of original text (input text) and four output texts of varying lengths.

The Original Text:
UF goal: Teaching robots how to think
By Sharman Stein
Of the Sentinel Staff
GAINESVILLE—Forget R2D2 in Star Wars; it never existed outside of Hollywood. The first smart robot could be born in a crowded laboratory at the University of Florida.

Its potential creators at the Center for Intelligent Machines and Robotics here have high hopes for the progeny of the third generation of robots. The smart robot will respond to unexpected changes, make judgments, communicate easily with humans and process information.

By comparison, robots of the first and second generations are mechanical morons, capable only of playing back one simple job or making very minor adjustments in a set routine.

To professor Delbert Tesar, director of the CIMAR team of faculty members and graduate students, the truly smart robot has the ability to do nothing less than save lives. In the battlefield, robots could take the place of humans. In the hospital, surgeons could use robots for delicate surgery.

In 1983–84, CIMAR will spend $1 million in the pursuit of mechanical and technological advances enabling robots to respond sharply and intelligently to computer commands.

One of CIMAR's major projects is a mobile robot. A truly mobile robot would be capable of navigating without underground sensors telling it where to go. To do this, scientists must imitate by computer program the intuitive process of the human mind.

"What we want from robotics," Tesar says, "is to make the worker a more effective craftsman and technologist." In manufacturing, robots should make possible the ultimate demand society, Tesar says. Want a car of a certain style, motor size and color? Just dial it up.

Such a scenario is far off, despite the hoopla generated by Wall Street and Hollywood. Widespread usage of robots in industry has not yet occurred. In fact, there are only 6,000 robots at work in America today. Existing technology is not versatile enough to make work any easier or any more efficient, Tesar says.

In a recent report on CIMAR's work, electrical engineering professor Alexander Meystel summed up the situation:

"After two decades of extensive research in artificial, particularly machine intelligence, we still do not have any unmanned assembly robot, unmanned vehicle, unmanned industrial nor military machine with the ability to make free choices in situations which require an intelligent decision."

Artificial intelligence is the broad concept of enabling machines to think and reason as humans and understand information conveyed by sight, speech and motion. Machine intelligence, which is most of CIMAR's work, enables robots to respond mechanically to computer commands.

CIMAR's chances of leading such development are good, Tesar says. "We are the world's experts in the technology of making robots move." Florida's strong manufacturing and technology base also lends itself to such research. "This area is on its way toward becoming 'robot alley,'" Tesar says.

Although the University of Florida has the only project of its kind within 1,000 miles, there is stiff competition.

The universities of Michigan, Rhode Island, Stanford and the Massachusetts Institute of Technology also have robot projects. Most of the schools, Tesar says, are working on robot applications in industry, rather than artificial intelligence.

The military is intensely interested in artificial intelligence. In the past 20 years, the Pentagon has poured half a billion dollars into computer research with the hope of developing robot weapons to eliminate some aspects of human risk.

In Japan, the government is preparing to start an eight-year research project in third-generation robotics. The government and industry project will have $85 million in government seed money to create robots with artificial intelligence.

Most of CIMAR's funding for the coming year came from the military. Since CIMAR was established in 1978, it has received almost $2.4 million. Sources include the state Board of Regents, the National Science Foundation, the Department of Energy, NASA and private industry.

Tesar sees no conflict in the university's relationship with defense. "Our object with robotics is to take people out of the war zone and reduce human sacrifice," he says.

The CIMAR team includes 10 university professors in the disciplines of mechanical, electrical and industrial engineering and computer science. There are also 40 graduate engineering students-but students cannot major in robotics. That would be a mistake, Tesar says, because the technology is still too immature.

The project's charter is education first, and technical development second. The shortage of trained technologists in the United States has this country in "grave straits," Tesar says. "We have a quarter as many engineers and the Soviet Union sends twelve times as many to work in defense."

Despite the urgency of this mission, getting finding has been difficult. "The only way a program like this exists is on outside money," Tesar says. "It is no featherbed. We've been living by our wits." Lately, he has been knocking on doors at the National Institute of Health for funding to do research in microsurgery.

"It is the ultimate use of robots," Tesar says, "but nobody understands what I'm talking about." His vision: A surgeon, operating from a removed "cockpit," would direct two three-inch robots to perform surgery. Such microsurgery would prolong the surgeon's productive life and increase his motor capacity, Tesar says.

Academic research will have to develop intelligent robots, Tesar says, because industry is not interested. Industry's goal is to make cheaper robots, not better ones, Tesar says. "They want to sell more and increase the market."

Commander Ronald Ohlander, program manager for intelligent systems at the Pentagon's Defense Advanced Research Projects Agency, said DARPA is counting heavily upon universities to do the significant work in artificial intelligence.

"Industry is not seriously involved in those efforts," Ohlander said in a telephone interview from Washington, D.C. "Universities are at the forefront of the research."

Department of Defense applications would include autonomous vehicles that can sense the environment, plan actions, follow scenarios and act contingent on the circumstances, Ohlander said.

CIMAR now has between eight and 10 ideas ready for patents, Tesar says. It is possible that some of these projects may be developed through a joint venture with a small company.

The hoped-for results of CIMAR's research—as well as the world's scientists—is the creation of machines capable of making intelligent choices in unpredictable situations, Meystel said in his report.

It is, he admits, a "big problem."

Summary #1 (14%)

The first smart robot could be born in a crowded laboratory at the University of Florida. One of Cimar's major projects is a mobile robot. A truly mobile robot would be capable of navigating without underground sensors telling it where to go. The smart robot will respond to unexpected changes make judgments communicate easily with humans and process information. To professor Delbert Tesar director of the Cimar team of faculty members and graduate students the truly smart robot has the ability to do nothing less than save lives.

After two decades of extensive research in artificial particularly machine intelligence we still do not have any unmanned assembly robot unmanned vehicle unmanned industrial nor military machine with the ability to make free choices in situations which require an intelligent decision. In a recent report on Cimar's work electrical engineering professor Alexander Meystel summed up the situation.

Most of Cimar's funding for the coming year came from the military. Machine intelligence which is most of Cimar's work enables robots to respond mechanically to computer commands. The Cimar team includes 10 university professors in the disciplines of mechanical electrical and industrial engineering and computer science.

Annotation #2 (7%)

The first smart robot could be born in a crowded laboratory at the University of Florida. One of Cimar's major projects is a mobile robot. The smart robot will respond to unexpected changes make judgments communicate easily with humans and process information. To professor Delbert Tesar director of the Cimar team of faculty members and graduate students the truly smart robot has the ability to do nothing less than save lives. The Cimar team includes 10 university professors in the discipline of mechanical electrical and industrial engineering and computer science.

Summary #3 (19%)

The first smart robot could be born in a crowded laboratory at the University of Florida. By comparison robots of the first and second generations are mechanical morons capable only of playing back one simple job or making very minor adjustments in a set routine. In the battlefield robots could take the place of humans. One of Cimar's major projects is a mobile robot. A truly mobile robot would be capable of navigating without underground sensors telling it where to go. The smart robot will respond to unexpected changes make judgments communicate easily with humans and process information. What we want from robotics Tesar says is to make the worker a more effective craftsman and technologist. Most of the schools Tesar says are working on robot applications in industry rather than artificial intelligence. To professor Delbert Tesar director of the Cimar team of faculty members and graduate students the truly smart robot has the ability to do nothing less than save lives. Widespread usage of robots in industry has not yet occurred. In 1983–84 Cimar will spend 1 million in the pursuit of mechanical and technological advances enabling robots to respond sharply and intelligently to computer commands. In manufacturing robots should make possible the ultimate demand society Tesar says. Tesar sees no conflict in the university's relationship with defense.

Extended Abstract #4 (22%)

The first smart robot could be born in a crowded laboratory at the University of Florida. By comparison robots of the first and second generations are mechanical morons capable only of playing back one simple job or making very minor adjustments in a set routine. In the battlefield robots could take the place of humans. One of Cimar's major projects is a mobile robot. A truly mobile robot would be capable of navigating without underground sensors telling it where to go. The smart robot will respond to unexpected changes make judgments communicate easily with humans and process information. What we want from robotics Tesar says is to make the worker a more effective craftsman and technologist. Most of the schools Tesar says are working on robot applications in industry rather than artificial intelligence. To professor Delbert Tesar director of the Cimar team of faculty members and graduate students the truly smart robot has the ability to do nothing less than save lives. Widespread usage of robots in industry has not yet occurred. After two decades of extensive research in artificial particularly machine intelligence we still do not have any unmanned assembly robot unmanned vehicle unmanned industrial nor military machine with the ability to make free choices in situations which require an intelligent decision. The government and industry project will have 85 million in government seed money to create robots with artificial intelligence. In 1983–84 Cimar will spend 1 million in the pursuit of mechanical and technological advances enabling robots to respond sharply and intelligently to computer commands. In manufacturing robots should make possible the ultimate demand society Tesar says. Tesar sees no conflict in the university's relationship with defense.

[End of Example]

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that the present invention is not limited to the particular embodiments disclosed, but it is intended to cover modifications within the spirit and scope of the present invention as defined by the appended claims.

What is claimed is:

1. A method of computer based text processing, the method comprising:
    (a) analyzing selected text units from a digitally coded text file to:
        i. determine text entities including meaningful N-word groups, phrases, simple sentences and compound sentences;
        ii. determine the interconnections between the text entities;
        iii. test the validity of the text entities; and
        iv. determine a quantitative measure of the significance of each text entity;
    (b) constructing a multigranular relational text structure incorporating the text entities; and
    (c) generating output text from the relational text structure.

2. The method of claim 1, wherein the output text is generated from the relational text structure using one or more entity grouping rules.

3. The method of claim 2, wherein the entity grouping rules require that the temporal order of the digitally coded text file be maintained in the output text.

4. The method of claim 2, wherein the entity grouping rules require the grouping of sentences having before action phrases with the same actor.

5. The method of claim 2, wherein the entity grouping rules require the grouping of sentences having after action phrases with the same subject or object upon which the action was executed.

6. The method of claim 2, wherein the entity grouping rules require the grouping of sentences having action phrases with the action belonging to a group of actions represented by the same generalized action.

7. The method of claim 1, wherein the output text generated from the relational text structure conforms to predefined user constraints.

8. The method of claim 7, wherein the predefined user constraints include the volume of output text to be generated, a set of keywords to be reflected in the output text, and the level of generalization of the output text.

9. The method of claim 1, wherein the text file is parsed using a system of natural dividers to recognize text sections, paragraphs, sentences, and words.

10. The method of claim 1, wherein analyzing the text units further comprises comparing each word against one or more dictionaries to determine its part of speech.

11. The method of claim 1, wherein analyzing the text units to determine text entities and test the validity of the text entities comprises attaching each word to the word in its immediate vicinity and using grammatical rules to reduce the ambiguity of the text unit.

12. The method of claim 1, wherein text units are selected from the parsed text file by using windowing and scanning, and analyzing the text units to determine text entities includes searching the text file to find frequent occurrences of words or groups of words.

13. The method of claim 1, wherein analyzing the text units to determine a quantitative measure of the significance is based on the frequency of occurrence, the number of associative links with other text entities, and correspondence of the text unit with predefined user parameters.

14. The method of claim 1, wherein the phrases include action phrases, before action phrases, and after action phrases, and wherein analyzing the text units to determine text entities is accomplished using grammatical rules for action and subject recognition.

15. The method of claim 1, wherein the simple sentences include triplets of interrelated before action phrases, action phrases and after action phrases.

16. The method of claim 1, wherein the output text is generated by grouping before action phrases, action phrases and after action phrases together as a relational structure.

17. The method of claim 1, wherein the volume of output text can be limited to a specified number of words while maintaining a level of text generalization factor ($k_G$), a depth of descriptive details factor ($k_{DD}$), and a semantic focus of attention factor($k_{FA}$), such that $k_G+k_{DD}+k_{FA}=1$.

18. A system for providing computer based text processing, the system comprising:
(a) means for analyzing selected text units from a digitally coded parsed text file to:
  i. determine text entities including meaningful N-word groups, phrases, simple sentences and compound sentences;
  ii. determine the interconnections between the text entities;
  iii. test the validity of the text entities; and
  iv. determine a quantitative measure of the significance of each text entity;
(b) means for constructing a multigranular relational text structure incorporating the text entities; and
(c) means for generating output text from the relational text structure.

19. The system of claim 18, wherein the means for generating output text uses one or more entity grouping rules.

20. The system of claim 19, wherein the entity grouping rules require that the temporal order of the digitally coded parsed text file be maintained in the output text.

21. The system of claim 19, wherein the entity grouping rules require the grouping of sentences having before action phrases with the same actor.

22. The system of claim 19, wherein the entity grouping rules require the grouping of sentences having after action phrases with the same subject or object upon which the action was executed.

23. The system of claim 19, wherein the entity grouping rules require the grouping of sentences having action phrases with the action belonging to a group of actions represented by the same generalized action.

24. The system of claim 18, wherein the means for analyzing selected text units attaches each word to the word in its immediate vicinity and uses grammatical rules to reduce the ambiguity of the text unit.

25. The system of claim 24, wherein the predefined user constraints include the volume of output text to be generated, a set of keywords to be reflected in the output text and the level of generalization of the output text.

26. The system of claim 18, wherein the digitally coded parsed text file is parsed using a system of natural dividers to recognize text sections, paragraphs, sentences, and words.

27. The system of claim 18, wherein the means for analyzing selected text units compares each word against one or more dictionaries to determine its part of speech.

28. The system of claim 18, wherein the means for analyzing selected text units uses windowing and scanning to search the text file to find frequent occurrences of words or groups of words.

29. The system of claim 18, wherein the means for analyzing selected text units determines the quantitative measure of the significance of each text entity based on the frequency of occurrence, the number of associative links with other text entities, and the correspondence of the text unit with predefined user parameters.

30. The system of claim 18, wherein phrases include action phrases, before action phrases, and after action phrases, and wherein the means for analyzing selected text units determines text entities using grammatical rules for action and subject recognition.

31. The system of claim 18, wherein simple sentences include triplets of interrelated before action phrases, action phrases and after action phrases.

32. The system of claim 18, wherein the output text generated from the relational text structure conforms to predefined user constraints.

33. The system of claim 18, wherein the means for generating output text groups before action phrases, action phrases and after action phrases together as a relational structure.

34. The system of claim 18, wherein the volume of output text can be limited to a specified number of words while maintaining a level of text generalization factor ($k_G$), a depth of descriptive details factor ($k_{DD}$), and a semantic focus of attention factor($k_{FA}$), such that $k_G+k_{DD}+k_{FA}=1$.

* * * * *